United States Patent
Paul et al.

(10) Patent No.: US 12,232,030 B2
(45) Date of Patent: Feb. 18, 2025

(54) METHOD FOR OPERATING A WIRELESS FIELD-DEVICE NETWORK

(71) Applicant: Endress+Hauser SE+Co. KG, Maulburg (DE)

(72) Inventors: Tobias Paul, Schopfheim (DE); Ralph Stib, Schönau (DE); Harald Schäuble, Lörrach (DE); Patrick Geib, Bad Säckingen (DE); Simon Gerwig, Schopfheim (DE); Mike Frank, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 403 days.

(21) Appl. No.: 17/433,837

(22) PCT Filed: Jan. 23, 2020

(86) PCT No.: PCT/EP2020/051628
§ 371 (c)(1),
(2) Date: Aug. 25, 2021

(87) PCT Pub. No.: WO2020/173625
PCT Pub. Date: Sep. 3, 2020

(65) Prior Publication Data
US 2022/0150826 A1    May 12, 2022

(30) Foreign Application Priority Data
Feb. 28, 2019    (DE) .................... 10 2019 105 096.0

(51) Int. Cl.
*H04W 52/02* (2009.01)
*H04L 12/18* (2006.01)

(52) U.S. Cl.
CPC ..... *H04W 52/0216* (2013.01); *H04L 12/1886* (2013.01); *H04W 52/0219* (2013.01)

(58) Field of Classification Search
None
See application file for complete search history.

(56) References Cited

U.S. PATENT DOCUMENTS

2006/0267792 A1* 11/2006 Schnaare ............... G08C 17/02
                                                           340/870.1
2007/0233835 A1    10/2007 Kushalnager et al.
(Continued)

FOREIGN PATENT DOCUMENTS

CN         109361273 A      2/2019
DE      102006009979 A1     9/2007
(Continued)

*Primary Examiner* — Chirag G Shah
*Assistant Examiner* — Suk Jin Kang
(74) *Attorney, Agent, or Firm* — Mark A. Logan; Endress+Hauser (USA) Holding, Inc.

(57) ABSTRACT

A method for operating a wireless field-device network, comprising: wirelessly transmitting a process variable and an expected remaining running time from each field device to the other field devices within a field-device network so that in each field device the process variable and the expected remaining running time of the other field devices of the field-device network are stored; activating a second radio module of that field device which has the highest expected remaining running time, and deactivating the second radio modules of the other field devices within the field-device network; wirelessly transmitting the process variables of all field devices of the field-device network stored in the active field device, or at least a subset of the stored process variables, to the superordinate unit, which is not part of the field-device network, by means of the second radio module of the active field device.

13 Claims, 2 Drawing Sheets

(56) References Cited

U.S. PATENT DOCUMENTS

| | | | |
|---|---|---|---|
| 2009/0102601 A1* | 4/2009 | Mathiesen | G05B 19/4185 340/3.1 |
| 2012/0326525 A1 | 12/2012 | Sinreich | |
| 2013/0035093 A1* | 2/2013 | Doyle | H04W 88/06 455/426.1 |
| 2013/0095877 A1 | 4/2013 | Smith et al. | |
| 2013/0275572 A1* | 10/2013 | Schaetzle | G05B 19/0426 709/223 |
| 2014/0172121 A1* | 6/2014 | Li | H04W 4/029 700/12 |
| 2015/0289309 A1* | 10/2015 | Kolavennu | H04W 4/70 370/310 |
| 2016/0018879 A1* | 1/2016 | Hsiao | H04W 52/0277 713/320 |
| 2016/0026194 A1 | 1/2016 | Mucignat et al. | |
| 2018/0302294 A1* | 10/2018 | Diancin | H04W 24/04 |
| 2020/0025600 A1* | 1/2020 | Waelde | G05B 19/0426 |
| 2020/0200827 A1* | 6/2020 | Cornwall | G01R 31/382 |
| 2020/0213853 A1* | 7/2020 | Fujimoto | H04L 63/20 |

FOREIGN PATENT DOCUMENTS

| | | |
|---|---|---|
| DE | 102013103454 A1 | 10/2014 |
| DE | 102017125371 A1 | 5/2019 |
| DE | 102018110101 A1 | 10/2019 |
| KR | 20100047449 A | 5/2010 |
| WO | 2015193849 A1 | 12/2015 |

* cited by examiner

METHOD FOR OPERATING A WIRELESS FIELD-DEVICE NETWORK

CROSS-REFERENCE TO RELATED APPLICATIONS

The present application is related to and claims the priority benefit of German Patent Application No. 10 2019 105 096.0, filed on Feb. 28, 2019 and International Patent Application No. PCT/EP2020/051628, filed on Jan. 23, 2020, the entire contents of which are incorporated herein by reference.

TECHNICAL FIELD

The invention relates to a method for operating a wireless field-device network.

BACKGROUND

In automation technology, especially in process automation technology, in many instances field devices serving to capture and/or influence process variables are used in what are known as automation systems. Sensors, for example fill-level measuring devices, flow meters, pressure and temperature measuring devices, pH-redox potential measuring devices, conductivity measuring devices etc., which capture the corresponding process variables of fill level, flow, pressure, temperature, pH level, or conductivity, serve for the recording of process variables. Actuators, for example drives, aggregates, valves, pumps, via which the flow rate of a fluid in a pipeline segment or the fill level in a container can be altered, serve to influence process variables. Furthermore, what are known as analyzers, which are based on Raman spectroscopy, Tunable Diode Laser technology, or other optical methods, for example near-infrared or UV technology, should also be understood as field devices in the present case. Furthermore, wet-chemical analyzers can also be used as field devices.

Field devices, in general, refer to all devices which are process-oriented and which supply or process process-relevant information.

Wireless field devices with batteries or rechargeable cells are increasingly used which are usually operated in a field device cluster or field-device network in order to wirelessly exchange with one another the process variables to be recorded or influenced. Field devices that are operated purely with rechargeable cells are thereby characterized in that it is possible to omit supplying a two-wire line or, where applicable, also a four-wire line to supply power to the field devices and/or to transmit the measured values, for example by means of the 4 . . . 20 mA standard that is customary in automation technology.

The nascent trend in automation technology toward simpler installation, reduced costs, and reduced maintenance demands, as well as the requirement for a seamless collection of information even in inaccessible or out-of-the-way areas, further increases the need for field devices that are operated exclusively with rechargeable cells, or are at least assisted with rechargeable cells. Following the trend, a plurality of mechanisms are currently being developed for saving power and for better predicting the current power level as well as the power requirement, from which the expected remaining running time or the time until the next charging of the rechargeable cell or the end of battery life is to be determined with increasing precision.

SUMMARY

The object of the invention is to show a possibility with which the running time of field devices in a field device cluster or field-device network can be extended.

The object is achieved according to the invention by the method according to patent claim 1.

The method according to the invention for operating a wireless field-device network which comprises a plurality of battery-operated or rechargeable cell-operated field devices, wherein each field device is configured to determine and/or set a process variable and to transmit or receive the process variable wirelessly within the field-device network by means of a first radio module; wherein each battery-operated or rechargeable cell-operated field device is also configured to determine an expected remaining running time or a variable modified thereby, especially a standardized variable, based on a current charge state of a battery and/or an rechargeable cell, and to wirelessly transmit or receive the expected remaining running time or the variable modified thereby within the field-device network by means of the first radio module;

wherein each field device also has a second radio module for wireless data transmission with a superordinate unit not belonging to the field-device network, provides the following steps:

wirelessly transmitting at least the process variable and the expected remaining running time from each field device to the other field devices within the field-device network, so that at least the process variable and the expected remaining running time of the other field devices of the field-device network are stored in each field device;

activating the second radio module of that field device which has the longest expected remaining running time, and deactivating at least the second radio modules of the other field devices within the field-device network so that only the field device which has the longest expected remaining running time is active and at least the second radio modules of the other field devices are deactivated;

wirelessly transmitting the process variables of all field devices of the field-device network stored in the active field device or at least a subset of the stored process variables, to the superordinate unit, which is not part of the field-device network, by means of the second radio module of the active field device.

An advantageous embodiment provides that the wireless transmission of the process variables and/or of the expected remaining running times or the variable modified thereby within the field-device network are transmitted by the first radio modules in a mesh network or an ad hoc network.

A further advantageous embodiment provides that the process variables and/or the expected remaining running times or the variables modified thereby are transmitted by broadcast telegrams by means of the first radio modules within the field-device network.

A further advantageous embodiment provides that the process variables and/or the expected remaining running times or the variables modified thereby are transmitted at regular time intervals within the field-device network, wherein the first radio modules are briefly activated at least for the duration of the transmission.

A further advantageous embodiment provides that the process variables and/or the expected remaining running times or the variables modified thereby are transmitted by the first radio modules with an average continuous power of the first radio modules in the range of approximately 1 mW to 250 mW, preferably up to 150 mW, especially preferably up to 100 mW.

A further advantageous embodiment provides that the wireless transmission of the process variables of all field devices of the field-device network are transmitted to the superordinate unit with an average continuous power of the second radio modules in the range of approximately 250 mW to 5 W, preferably in the range of approximately 500 mW to 5 W.

A further advantageous embodiment provides that the wireless transmission of at least the process variables of all field devices of the field-device network to the superordinate unit is performed cyclically without a request from the superordinate unit.

A further advantageous embodiment provides that the wireless transmission of at least the process variables of all field devices of the field-device network to the superordinate unit is initiated by a request from the superordinate unit. Especially, the embodiment may provide that the request is initiated by the superordinate unit via multicast telegrams to the field-device network.

A further advantageous embodiment provides that each field device is further configured to transmit or receive at least a portion of its parameters wirelessly within the field-device network by means of the first radio module, and the method further comprises the following steps:

wirelessly transmitting the at least one portion of parameters from each field device to the other field devices within the field-device network, so that at least the portion of the parameters of the other field devices of the field-device network are stored in each field device, and wirelessly transmitting at least the portion of the parameters of all field devices of the field-device network which are stored in the active field device to the superordinate unit via the second radio module of the active field device.

The embodiment can especially provide that, in the event that the superordinate unit requests a process variable and/or a parameter at the active field device which is not stored in said active field device, the method further provides that, for the field devices in which at least the second radio module is deactivated, the process variable and/or the parameter is actively requested by the active field device, and the process variable and/or the parameter is transmitted to the active field device by means of the first radio module, and the process variable and/or the parameter is transmitted to the superordinate unit by means of the second radio module of the active field device.

The embodiment may especially also provide that the process variable and/or the parameter is transmitted to the active field device by means of the first radio module in the course of transmission at regular time intervals. Furthermore, the embodiment may alternatively provide that the process variable and/or the parameter is implemented to the active field device by means of the first radio module via a short-term activation of the actually deactivated field device, so that the process variable and/or the parameter is transmitted immediately.

BRIEF DESCRIPTION OF THE DRAWINGS

The invention is explained in more detail based upon the following drawings. The following is shown.

DETAILED DESCRIPTION

Figure 1:
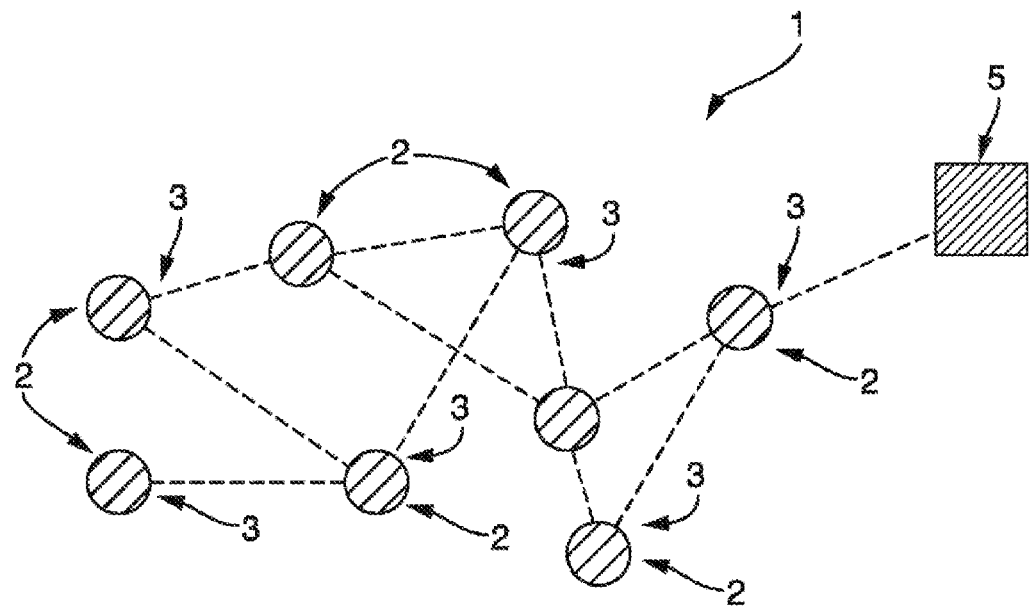
FIG. 1 shows a first method, known from the prior art, for operating a field device cluster or field-device network.
Figure 2:
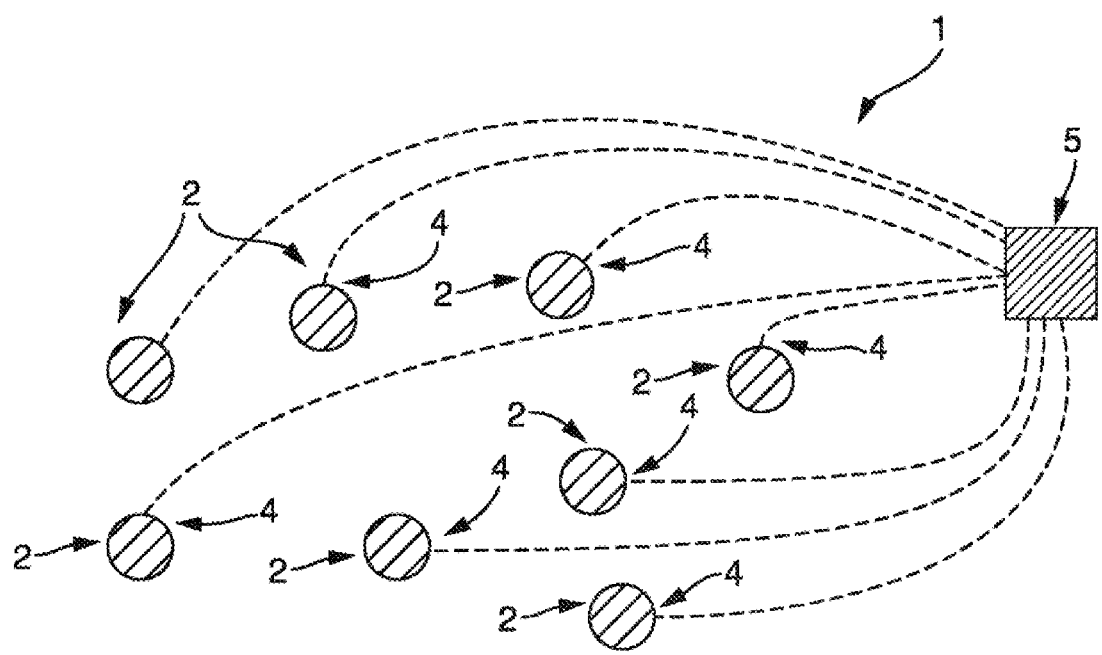
FIG. 2 shows a second method, known from the prior art, for operating a field device cluster or field-device network.

FIG. 1 and FIG. 2 show field device clusters 1, known from the prior art, which are used for wireless data transmission. Each cluster 1 thereby consists of a plurality of spatially proximal field devices 2. Each field device 2 thereby serves to capture and/or influence a process variable in an automation system in order to thus execute or control a process. The field devices 2 can hereby capture or influence various process variables, or also respective different process variables. To supply power to the individual field devices 2, these respectively have a rechargeable cell or a battery which is preferably introduced into the housing of the field device. However, variants are also known in which the rechargeable cell or the battery are mounted on the housing of the respective field device as a separate, preferably pluggable module.

With regard to wireless communication, there are known methods from the prior art.

First, there is the method shown in FIG. 1 in which, for wireless communication of at least the process variable and possibly also other data within the cluster 1, each field device 2 has a first radio module 3 via which the process variable is communicated by means of an efficient and power-saving radio protocol. For wireless data transmission, the first radio modules 3 hereby require an average continuous power of preferably approximately 1 mW to 250 mW, especially preferably a continuous power of up to 150 mW, very especially preferably up to 100 mW. Via an efficient and power-saving radio protocol according to which the first radio modules 3 communicate the data, a sensor cluster 1 is spanned which enables a routing and addressing of each field device participant within the cluster via mesh network protocols, even if the participant cannot be reached directly (e.g., in the form of a point-to-point connection). Examples of such protocols are: Bluetooth, ANT, Babel (RFC 6126), DSR (RFC 4728), AODV, ABR, DREAM, OLSR, ZRP, ZHLS etc. Typically, the process variables are relayed to a superordinate unit 5 or a master by means of acyclical or cyclical communication. For this purpose, the superordinate unit 5 is connected by radio to only a single participant of the cluster, via the power-saving first radio module 3.

Furthermore, there is the method shown in FIG. 2, in which the superordinate unit 5 is arranged spatially outside of the radio range of the power-saving first radio modules 3 of the cluster participants. In order to nevertheless enable wireless data transmission between the field devices 2 of the cluster 1 and the superordinate unit 5, switching must occur to a different physics with a different frequency range with markedly higher power.

For this purpose, the field devices 2 of the cluster respectively have a second radio module which, for data transmission, require an average continuous power in the range of preferably approximately 250 mW to 5 W, especially preferably in the range of approximately 500 mW to 5 W. In this method, the data transmission with the superordinate unit takes place directly with each individual participant 2 of the cluster 1.

In order to maximize the remaining running time of the battery or rechargeable cell, it can be provided that the data are transmitted in small packets and at large time intervals.

The invention now assumes the approach that both methods are combined, and also that the particular remaining running time of a rechargeable cell or battery is known to each cluster participant or field device 2a, 2b of cluster 1, and this is transmitted to the other field devices via the power-saving first radio module 3. The remaining rechargeable cell or battery running time can be transmitted either in the form of a time unit (day, hour, minute) or in the form of a standardized value. The transmission preferably takes place at defined time intervals. In that the particular and the remaining running time of the other field device 2a, 2b is known to each field device 2a, 2b, only the second radio module 4 of that field device 2a which has the longest remaining running time to be expected must/can be activated. The second radio modules 4 of the other field devices 2b can thus be deactivated in order to save energy. All process variables can hereby be transmitted jointly as a packet, or else only the process variable of individual field devices 2b can be transmitted. So that just the process variable of individual field devices 2b may also be transmitted, the process variables are provided with a field device-specific identifier, for example with the serial number of the respective field device. In addition to the serial number, however, another unique identification feature can also be used for the field devices.

So that the field device 2a having the longest expected remaining running time can transmit the process variable of the other field devices 2b to the superordinate unit 5 as well, the process variable of the other field devices 2a, 2b must be stored in each field device 2a, 2b. For example, this can take place in such a way that the field devices 2a, 2b of the cluster 1 transmit their process variable via broadcast telegrams in the cluster 1, preferably via the power-saving first radio module 3. The transmission of the process variable preferably also takes place at regular time intervals, for example together with the transmission of the remaining running time. It is inherently understood that, in addition to the process variable and the remaining running time, additional data can also be transmitted wirelessly in this way, especially configuration and/or parameterization data of the individual field devices 2a, 2b.

Figure 3:
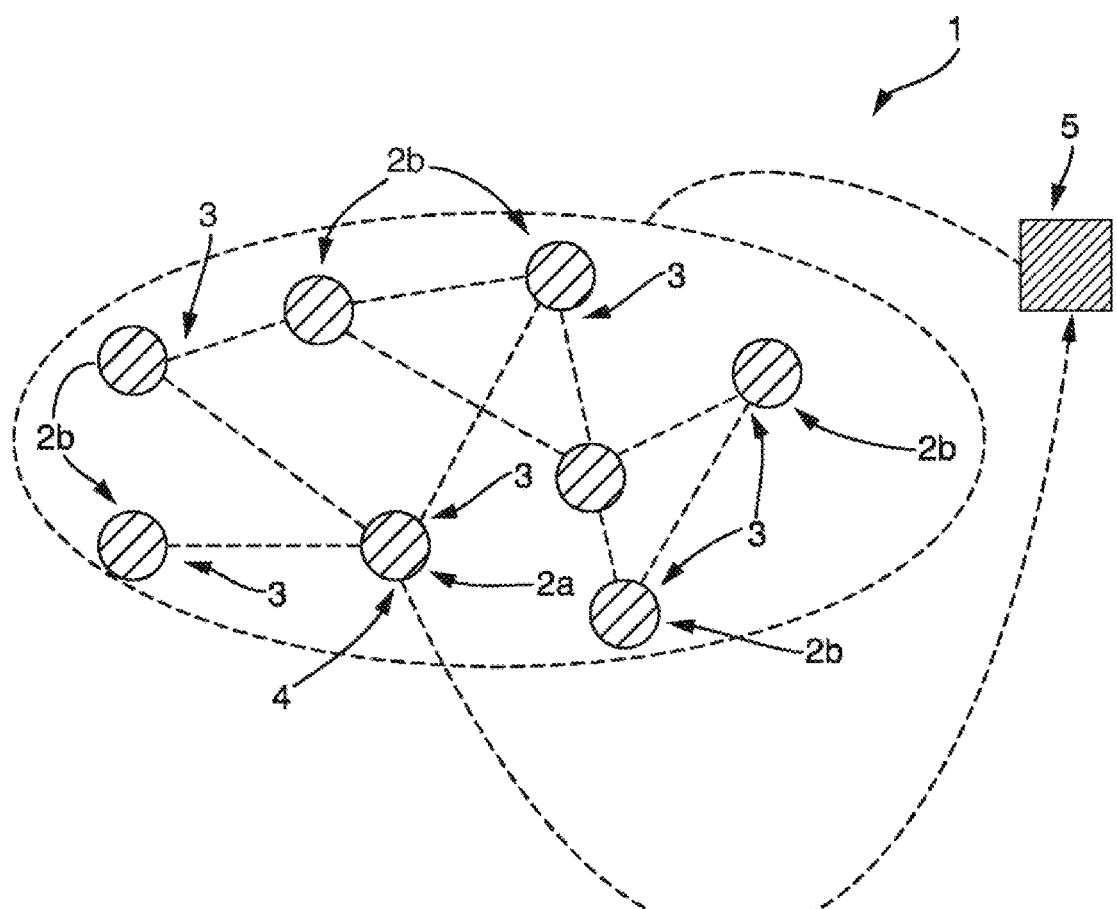
FIG. 3 shows a field device cluster or a field-device network in which the method according to the present disclosure is to be illustrated.

The power requirement of the entire cluster can be greatly reduced via the method according to the invention, because only a second radio module 4 of the field device 2a having the longest remaining running time to be expected needs to be externally active, and the others are deactivated. Thus, only the field device 2a having the longest remaining running time to be expected remains active with its second radio module 4 with respect to the incoming radio traffic of the superordinate unit, and provides the process variables upon request by the superordinate unit. The superordinate unit thereby does not know the field device to which it specifically connects for wireless data transmission; rather, it transmits the request to the cluster. In terms of radio, the cluster 1 thus acts outwardly as a unit. In FIG. 3, the unit is schematically represented by the dashed ellipse. The superordinate unit 5 preferably transmits the request via multicast telegrams to a multicast address of the cluster.

The method according to the invention is thereby not only limited to the instance in which the superordinate unit 5 actively requests the process variables, but rather also includes the instance in which cluster 1 itself transmits the process variables to the superordinate unit at a defined time interval, for example once per week or once per day.

Furthermore, the method according to the invention can provide that individual field devices 2b whose second radio modules 4 are actually deactivated are briefly activated. This can take place, for example, upon requests from the superordinate unit 5, given a parameterization, or upon expiration of the interval in which the process variable is automatically transmitted to the superordinate unit 5. However, even in the event that the remaining running time of the currently active field device 2a falls below the remaining running time of another field device, the second radio module of the field device with the then longer remaining running time can be "woken up" or activated in order to maintain wireless communication with the superordinate unit.

In the event that the superordinate unit 5 requests data (process variable, parameter values, and/or configuration values etc.) from a non-active field device 2b, the method can provide that the active field device 2a "wakes up" the non-active field device 2b whose data was requested, i.e. activates its second radio module 4, and the data are transmitted directly from the "woken up" field device to the superordinate unit 5. Alternatively, it may be provided that the active field device 2a waits until the non-active field device 2b activates within the scope of the cyclic communication of the remaining running time and/or process variable, and then requests the data at the field device. The requested data are then transmitted via the first radio module 3 to the field device 2a whose second radio module 4 is activated, and are relayed from this to the superordinate unit 5 by means of the second radio module 4.

The invention claimed is:

1. A method for operating a wireless field-device network that includes a plurality of battery-operated field devices, wherein each field device is configured to determine, set, or determine and set a process variable, and to transmit and receive the process variable wirelessly within the field-device network via a first radio module of the respective field device, wherein each battery-operated field device is also configured to determine an expected remaining running time based on a current charge state of a battery, and to wirelessly transmit and receive the expected remaining running time within the field-device network via the first radio module, wherein each field device also has a second radio module for wireless data transmission with a superordinate unit not belonging to the field-device network, the method comprising:

wirelessly transmitting the process variable and the expected remaining running time based on the current charge state of a battery from each field device to the other field devices within the field-device network so that the process variable and the expected remaining running time of the other field devices of the field device network are stored in each field device;

activating the second radio module of a field device which has a longest remaining running time to be expected, and deactivating the second radio modules of the other field devices within the field-device network so that the second radio module of only the field device which has the longest remaining running time to be expected is active and the second radio modules of the other field devices within the field-device network are deactivated; and wirelessly transmitting the stored process variables, or at least a subset of the stored process variables, of the plurality of field devices of the field-device network stored in the field device having the active second radio module to the superordinate unit via the second radio module of the active field device.

2. The method according to claim 1, wherein the wireless transmission of the process variables and the expected remaining running times thereby are transmitted within the field-device network by the first radio modules in a mesh network or an ad hoc network.

3. The method according to claim 1, wherein the process variables and the expected remaining running times are transmitted within the field-device network via broadcast telegrams via the first radio modules.

4. The method according to claim 1, wherein the process variables and the expected remaining running times are transmitted at regular time intervals within the field-device network, wherein the first radio modules are briefly activated at least for the duration of the transmission.

5. The method according to claim 1, wherein the process variables and the expected remaining running times are transmitted by the first radio modules with an average continuous power of the first radio modules in the range of 1 mW to 250 mW.

6. The method according to claim 1, wherein the wireless transmission of the stored process variables, or at least the subset of the stored process variables, of the plurality of field devices of the field-device network are transmitted to the superordinate unit with an average continuous power of the second radio modules in the range of approximately 250 mW to 5 W.

7. The method according to claim 1, wherein the wireless transmission of the stored process variables, or at least the subset of stored process variables, of the plurality of field devices of the field-device network to the superordinate unit is performed cyclically without a request from the superordinate unit.

8. The method according to claim 1, wherein the wireless transmission of the stored process variables, or at least the subset of stored process variables, of the plurality of field devices of the field-device network to the superordinate unit is initiated by a request from the superordinate unit.

9. The method according to claim 8, wherein the request is initiated by the superordinate unit via multicast telegrams to the field-device network.

10. The method according to claim 4, wherein each field device is further configured to transmit or receive at least a portion of its parameters wirelessly within the field-device network via the first radio module, the method further comprising:

wirelessly transmitting the portion of parameters from each field device to the other field devices within the field-device network so that at least the portion of the parameters of the other field devices of the field-device network are stored in each field device; and wirelessly transmitting at least the portion of the parameters of the plurality of field devices of the field-device network, which are stored in the active field device having the active second radio module, to the superordinate unit via the second radio module of the field device having the active second radio module.

11. The method according to claim 10, wherein when the superordinate unit requests a process variable or parameter from the field device having the active second radio module which is not stored in the field device having the active second radio module, the method further comprises:

requesting by the field device having the active second radio module from the field devices in which the second radio module is deactivated the process variable or parameter requested by the superordinate unit;

transmitting to the field device having the active second radio module via the first radio module the process variable or parameter requested by the superordinate unit; and transmitting to the superordinate unit via the second radio module of the field device having the active second radio module the process variable or parameter requested by the superordinate unit.

12. The method according to claim 11, wherein the process variable or parameter requested by the superordinate unit is transmitted from the field device in which the second radio module is deactivated to the field device having the active second radio module via the first radio module in the course of the transmission at regular time intervals.

13. The method according to claim 12, wherein the process variable or parameter requested by the superordinate unit is transmitted from the field device in which the second radio module is deactivated to the field device having the active second radio module via the first radio module via a short-term activation of the field device in which the second radio module is deactivated so that the process variable or the parameter requested by the superordinate unit is transmitted immediately.

* * * * *